US011754835B2

(12) United States Patent
Zhang et al.

(10) Patent No.: US 11,754,835 B2
(45) Date of Patent: Sep. 12, 2023

(54) IMAGE ACQUISITION METHOD, HANDLE DEVICE, HEAD-MOUNTED DEVICE AND HEAD-MOUNTED SYSTEM

(71) Applicant: QINGDAO PICO TECHNOLOGY CO., LTD., Shandong (CN)

(72) Inventors: Xiuzhi Zhang, Shandong (CN); Hongwei Zhou, Shandong (CN); Guanghui Liu, Shandong (CN); Hengjiang Guo, Shandong (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/817,634

(22) Filed: Aug. 4, 2022

(65) Prior Publication Data
US 2022/0373793 A1 Nov. 24, 2022

Related U.S. Application Data

(63) Continuation of application No. PCT/CN2021/118545, filed on Sep. 15, 2021.

(30) Foreign Application Priority Data

Oct. 28, 2020 (CN) .......................... 202011176796.8

(51) Int. Cl.
*G02B 27/00* (2006.01)
*G02B 27/01* (2006.01)
(Continued)

(52) U.S. Cl.
CPC ..... *G02B 27/0093* (2013.01); *G02B 27/0172* (2013.01); *G06F 3/014* (2013.01); *G06F 3/0308* (2013.01); *G02B 2027/0138* (2013.01)

(58) Field of Classification Search
CPC ...... G06F 3/014; G06F 3/0308; G06F 3/0346; G06F 3/017; A63F 13/24; A63F 13/212;
(Continued)

(56) References Cited

U.S. PATENT DOCUMENTS 10,175,489 B1 * 1/2019 Robbins .................. G06F 3/013
10,204,406 B2 * 2/2019 Becker .................... G06V 20/56
(Continued)

FOREIGN PATENT DOCUMENTS

CN 106768361 A 5/2017
CN 107233729 A 10/2017
(Continued)

OTHER PUBLICATIONS

International Search Report dated Nov. 24, 2021 in International Application No. PCT/CN2021/118545, with English translation (6 pages).
(Continued)

*Primary Examiner* — William Lu

(57) ABSTRACT

The embodiments of the disclosure relate to an image acquisition method, a handle device, a head-mounted device and a head-mounted system. The handle device comprises a shell and a control module arranged in the shell. A switch control end of an infrared circuit is connected with the control module, and infrared light beads of the infrared circuit penetrate outwards through the shell; and a switch control end of a visible light circuit is connected with the control module, and visible light strips of the visible light circuit penetrate outwards through the shell. Through visible light and infrared light set on the handle, the position of the handle device can be judged, and the tracking accuracy is extremely high.

17 Claims, 5 Drawing Sheets

(51) Int. Cl.
*G06F 3/01* (2006.01)
*G06F 3/03* (2006.01)

(58) Field of Classification Search
CPC ................ A63F 13/213; A63F 13/219; A63F 2300/8082
See application file for complete search history.

(56) References Cited

U.S. PATENT DOCUMENTS

| | | | | |
|---|---|---|---|---|
| 10,447,265 | B1* | 10/2019 | Tompkins | G06F 3/011 |
| 10,831,286 | B1* | 11/2020 | Pepose | G06F 3/011 |
| 11,127,215 | B1* | 9/2021 | Narvaez | G09G 3/001 |
| 11,128,636 | B1* | 9/2021 | Jorasch | A61B 5/7405 |
| 11,353,175 | B1* | 6/2022 | Xie | F21V 17/101 |
| 11,416,074 | B1* | 8/2022 | Trincia | G02B 1/045 |
| 2004/0256561 | A1* | 12/2004 | Beuhler | H04N 23/84 |
| | | | | 348/E5.037 |
| 2006/0277571 | A1* | 12/2006 | Marks | A63F 13/42 |
| | | | | 725/37 |
| 2009/0066504 | A1* | 3/2009 | Breier | G08B 5/002 |
| | | | | 340/539.13 |
| 2009/0208221 | A1* | 8/2009 | Sasai | H04B 10/116 |
| | | | | 398/118 |
| 2010/0033427 | A1* | 2/2010 | Marks | H04N 1/00129 |
| | | | | 348/E5.022 |
| 2012/0026293 | A1* | 2/2012 | Gruetzmann | G01B 11/275 |
| | | | | 348/46 |
| 2012/0307075 | A1* | 12/2012 | Margalit | G06T 1/0007 |
| | | | | 348/180 |
| 2014/0062882 | A1* | 3/2014 | Ozawa | G06F 3/038 |
| | | | | 345/158 |
| 2015/0054734 | A1* | 2/2015 | Raghoebardajal | G06F 3/0308 |
| | | | | 348/164 |
| 2015/0177831 | A1* | 6/2015 | Chan | G02B 27/0172 |
| | | | | 345/156 |
| 2015/0258431 | A1* | 9/2015 | Stafford | A63F 13/212 |
| | | | | 463/31 |
| 2015/0371083 | A1* | 12/2015 | Csaszar | H04N 23/90 |
| | | | | 382/103 |
| 2016/0191158 | A1* | 6/2016 | Aoyama | H04B 10/54 |
| | | | | 398/172 |
| 2016/0338441 | A1* | 11/2016 | London | A43B 5/00 |
| 2017/0195654 | A1* | 7/2017 | Powers | H04N 23/11 |
| 2017/0273665 | A1* | 9/2017 | Kapoor | A61B 6/12 |
| 2018/0017679 | A1* | 1/2018 | Valouch | G01S 17/06 |
| 2018/0110428 | A1* | 4/2018 | Murakami | A61B 5/6893 |
| 2018/0272232 | A1* | 9/2018 | Campbell | G06F 3/038 |
| 2018/0330521 | A1* | 11/2018 | Samples | G06F 3/011 |
| 2019/0094989 | A1* | 3/2019 | Chen | G06F 3/012 |
| 2019/0129036 | A1* | 5/2019 | Valouch | H01L 51/426 |
| 2019/0195991 | A1* | 6/2019 | Miki | G01S 7/4808 |
| 2019/0258058 | A1* | 8/2019 | Fortin-Deschenes | |
| | | | | G06T 19/006 |
| 2019/0261498 | A1* | 8/2019 | Akita | A61B 1/00006 |
| 2019/0295213 | A1* | 9/2019 | Price | G02B 27/017 |
| 2019/0295273 | A1* | 9/2019 | Price | H04N 13/344 |
| 2019/0302907 | A1* | 10/2019 | Wakimoto | G06F 3/0383 |
| 2020/0301508 | A1* | 9/2020 | Uchida | G06F 3/014 |
| 2021/0044767 | A1* | 2/2021 | Rajasekaran | H04N 23/741 |
| 2021/0208673 | A1* | 7/2021 | Forster | G06V 20/20 |
| 2021/0312918 | A1* | 10/2021 | Herrmann | H04R 1/08 |
| 2021/0365064 | A1* | 11/2021 | Liu | G06F 3/0346 |
| 2022/0103757 | A1* | 3/2022 | Ding | H04N 5/04 |

FOREIGN PATENT DOCUMENTS

| | | | | |
|---|---|---|---|---|
| CN | 207704395 | U | 8/2018 | |
| CN | 108700957 | A | 10/2018 | |
| CN | 110059621 | A | 7/2019 | |
| CN | 110572635 | A | 12/2019 | |
| CN | 110622107 | A | 12/2019 | |
| CN | 110865706 | A | 3/2020 | |
| CN | 111174683 | A | 5/2020 | |
| CN | 111614915 | A | 9/2020 | |
| CN | 111752386 | A | 10/2020 | |
| CN | 112437213 | A * | 3/2021 | ............ A63F 13/24 |
| CN | 112437213 | A | 3/2021 | |
| JP | 2020052793 | A | 4/2020 | |

OTHER PUBLICATIONS

First Office Action dated Oct. 11, 2021 in Chinese Application No. 202011176796.8, with English translation (20 pages).

* cited by examiner

IMAGE ACQUISITION METHOD, HANDLE DEVICE, HEAD-MOUNTED DEVICE AND HEAD-MOUNTED SYSTEM

CROSS-REFERENCE TO RELATED APPLICATION

The present disclosure is a continuation of PCT/CN2021/118545 filed Sep. 15, 2021 which is based on Chinese Patent Application No. CN202011176796.8 filed Oct. 28, 2020, with the disclosure title of "Image Acquisition Method, Handle Device, Head-mounted Device and Head-mounted System", and claims priority to the application, the disclosure of which is incorporated herein by reference in its entirety.

TECHNICAL FIELD

The embodiments of the disclosure relate to the technical field of smart head-mounted devices, specifically relating to an image acquisition method, a handle device, a head-mounted device and a head-mounted system.

BACKGROUND

At present, most of the existing designs for integrated head-mounted machines support 6 degrees of freedom (6DOF) tracking by the head. During tracking, the relative position of the head-mounted device and the handle device can be judged by optical, ultrasonic, electromagnetic and other schemes.

For the electromagnetic tracking scheme, the device will be disturbed by the external magnetic field because of the characteristics of the magnetic field, which will affect the judgment accuracy and tracking quality and cause high costs. For the ultrasonic tracking scheme, as the relative distance of the handle device is judged by the ultrasonic transmitter and receiver and ultrasonic waves are easily affected by factors such as occlusion and reflection, the ultrasonic tracking has the problem of poor measurement accuracy. At present, the optical tracking scheme is mainly based on infrared light, which is greatly affected by the external environment. For example, the light of the handle will be weakened when the ambient light is strong, resulting in unstable tracking. Therefore, it is very necessary to provide a scheme that can accurately judge the relative position of the handle device, so as to improve the tracking accuracy of the handle device and the stability of the environment.

SUMMARY

The embodiments of the disclosure provide a new technical scheme capable of accurately judging the relative position of handle devices.

According to the first aspect of the embodiments of the disclosure, a handle device is provided, wherein the handle device comprises a shell;

a control module, wherein the control module is arranged in the shell;

an infrared circuit, wherein a switch control end of the infrared circuit is connected with the control module, and infrared light beads of the infrared circuit penetrate outwards through the shell; and a visible light circuit, wherein a switch control end of the visible light circuit is connected with the control module, and visible light strips of the visible light circuit penetrate outwards through the shell.

In an exemplary embodiment, the control module comprises a processor chip and a wireless communication chip connected with the processor chip, and the switch control end of the infrared circuit and the switch control end of the visible light circuit are all connected with the wireless communication chip;

The handle device further comprises an input device for user operation, wherein the input device is connected with the processor chip.

In an exemplary embodiment, the wireless communication chip is a Bluetooth Low Energy (BLE) chip.

In an exemplary embodiment, the handle device further comprises an inertial measurement unit, wherein the inertial measurement unit is connected with the wireless communication chip.

According to the second aspect of the embodiments of the disclosure, an image acquisition method for the handle device according to embodiments above is provided, wherein the method is implemented by a head-mounted device provided with at least one camera, and the method comprises the following steps of:

acquiring a first exposure time for an environment image and a second exposure time for a handle image in an image acquisition cycle of the camera, wherein the environment image is an image of the environment in which the head-mounted device is located, and the handle image is an image of the handle device;

setting exposure parameters of the camera according to the first exposure time and the second exposure time of the camera; and controlling the camera to acquire the environment image and the handle image according to the exposure parameters of the camera in a time-sharing manner during the image acquisition cycle.

In an exemplary embodiment, the head-mounted device comprises a plurality of cameras, and center points of the plurality of cameras at the first exposure time are aligned; and/or the second exposure time of the plurality of cameras is the same.

In an exemplary embodiment, the method further comprises the following steps of:

obtaining a first lighting time for the handle device to light the infrared light beads and a second lighting time for lighting the visible light strips in the image acquisition cycle according to the second exposure time; and transmitting control information about the first lighting time and the second lighting time to the handle device to enable the handle device to control the infrared circuit and the visible light circuit according to the control information.

In an exemplary embodiment, the method further comprises the following steps of:

monitoring a time gap of bluetooth transmission between the head-mounted device and the handle device; and transmitting a beacon frame for time synchronization to the handle device in the time gap.

In an exemplary embodiment, the method further comprises the following steps of: obtaining a distance between the head-mounted device and the handle device; determining lighting brightness of the visible light strips according to the distance; and transmitting control information about the lighting brightness to the handle device to enable the handle device to control the visible light circuit according to the control information.

According to the third aspect of the embodiments of the disclosure, a head-mounted device is further provided, comprising a memory and a processor, wherein the memory stores a computer program, and the processor is used to perform the image acquisition method according to the above embodiments under the control of the computer program.

According to the fourth aspect of the embodiments of the disclosure, a head-mounted system is further provided, comprising the head-mounted device and the handle device above, wherein the head-mounted device is wirelessly connected with the handle device.

The handle device according to the present embodiment is provided with an infrared circuit and a visible light circuit, and can control the switch of the visible light circuit and the infrared circuit through a control module. For this kind of handle devices, the head-mounted device collects a handle image of the handle device and clearly calculates a position of the handle device according to visible light patterns and infrared light spots in the handle image, achieving the tracking and positioning of the handle device. Therefore, it is possible to judge the position of the handle device, realize high-precision tracking, and solve the problem that it is difficult to accurately judge the position of the handle device in any environment.

Other features of the disclosure and their advantages will become apparent from the following detailed description of exemplary embodiments of the disclosure with reference to the drawings.

BRIEF DESCRIPTION OF THE DRAWINGS

The drawings which are incorporated in and constitute a part of the specifications, illustrate embodiments of the disclosure and, together with the description thereof, serve to explain the principles of the disclosure.

DETAILED DESCRIPTION OF THE EMBODIMENTS

Various exemplary embodiments of the disclosure will now be described in detail with reference to the drawings. It should be noted that, the relative arrangements numeric expressions and values of the components and steps set forth in these embodiments do not limit the scope of the disclosure, unless otherwise specified.

The following description of at least one exemplary embodiment is in fact illustrative only and is in no way intended to limit the disclosure and its application or use.

Techniques, methods and devices known to persons of ordinary skill in the related art may not be discussed in detail, but where appropriate, the techniques, methods and devices should be regarded as part of the specifications.

In all examples shown and discussed herein, any specific value should be interpreted as illustrative only and not as a limitation. Therefore, other examples of exemplary embodiments may have different values.

It should be noted that, similar numbers and letters refer to similar items in the following drawings. Therefore, once an item is defined in one drawing, such item will not be further discussed in the subsequent drawings.

Figure 1:
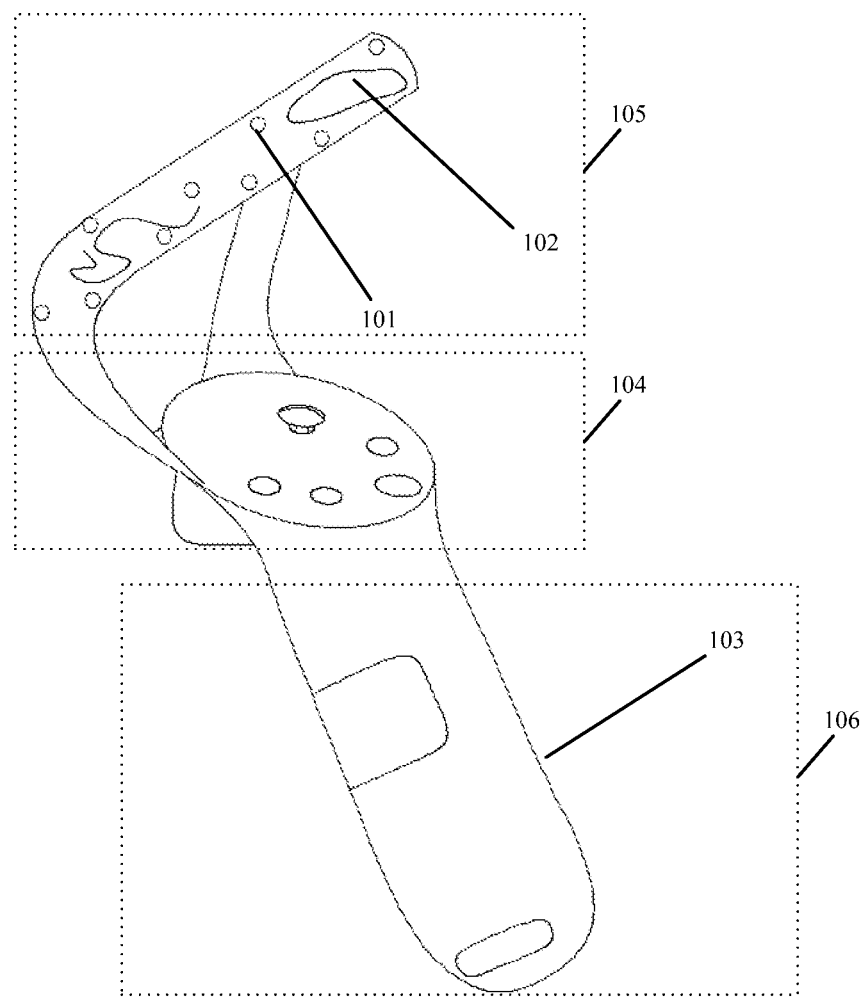
FIG. 1 is a structure diagram of a handle device to which embodiments of the disclosure can be applied.
Figure 2:
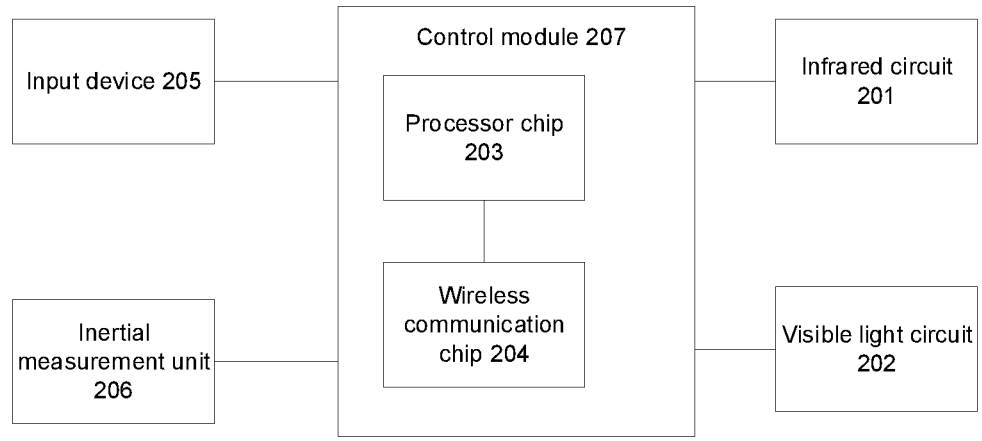
FIG. 2 is a structure diagram of the interior of a handle device according to an embodiment of the disclosure.

FIG. 1 shows a schematic diagram of a mechanical structure of a handle device according to an embodiment and FIG. 2 shows a structure diagram of the interior of a handle device.

As shown in FIG. 1 and FIG. 2, the handle device may comprise a shell 103, a control module 207, an infrared circuit 201 and a visible light circuit 202.

The color of the shell 103 may be selected according to a user's preference, for example, black, white, and black and white. The shell 103 may be made of any material, such as a plastic material, which is not limited herein.

The control module 207, the infrared circuit 201 and the visible light circuit 202 may be arranged on a circuit board of the handle device, wherein the circuit board is arranged in the shell 103.

The switch control end of the infrared circuit 201 is connected with the control module 207, and the infrared light beads 101 of the infrared circuit 201 penetrate outward through the shell 103. Each infrared light bead 101 corresponds to an infrared light spot. The part corresponding to the infrared light beads 101 of the shell 103 may be a hollow part or a transparent part, so that the infrared light beads 101 penetrate outward through the shell.

The infrared light beads 101 and the infrared circuit 201 may be arranged in one-to-one correspondence, so that each infrared light bead 101 can be independently controlled. All of the infrared light beads 101 may correspond to one infrared circuit 201 or may, in groups, correspond to different infrared circuits 201 and the like, which is not limited herein.

The infrared circuit 201 may comprise the infrared light beads 101 and a first controllable switch, wherein the infrared light beads 101 and the first controllable switch are connected in series between a power supply end and an earth terminal, and a control end of the first controllable switch is the control end of the infrared circuit 201. The first controllable switch may be a transistor, a MOS transistor, or the like, which is not limited herein.

The control module 207 may output a control signal for lighting the infrared light beads 101 to the switch control end of the infrared circuit 201, so that the infrared light beads 101 are lit; the control module 207 may also output a control signal for extinguishing the infrared light beads 101 to the switch control end of the infrared circuit 201, so that the infrared light beads 101 are extinguished.

The switch control end of the visible light circuit 202 is connected with the control module 207, and visible light strips 102 of the visible light circuit 202 penetrate outwards through the shell. Each visible light strip 102 corresponds to a visible light pattern. The part corresponding to the visible light strips 102 of the shell may be a hollow part or a transparent part, so that the visible light strips 102 penetrate outward through the shell.

The handle device may be provided with one visible light strip 102 or at least two visible light strips 102. The visible light strips 102 and the visible light circuit 202 may be arranged in one-to-one correspondence, so that each visible light strip 102 can be independently controlled. All of the visible light strips 102 may correspond to one visible light circuit 202 or may, in groups, correspond to different visible light circuits 202 and the like, which is not limited herein.

The visible light circuit 202 may comprise the visible light strips 102 and a second controllable switch, wherein the visible light strips 102 and the second controllable switch are connected in series between a power supply end and an earth terminal, and a control end of the second controllable switch is the control end of the visible light circuit 202. The second controllable switch may be a transistor, a MOS transistor, or the like, which is not limited herein.

The control module 207 may output a control signal for lighting the visible light strips 102 to the switch control end of the visible light circuit 202, so that the visible light strips 102 are lit; the control module 207 may also output a control signal for extinguishing the visible light strips 102 to the switch control end of the visible light circuit 202, so that the visible light strips 102 are extinguished.

In some embodiments, the visible light strips 102 of the visible light circuit 202 penetrate outwards through the shell 103, and form visible light patterns outside the shell 103. The shape of the visible light patterns is variable and can be designed by a user according to his own requirements.

In some embodiments, the control module 207 comprises a processor chip 203 and a wireless communication chip 204 connected with the processor chip 203 and the switch control end of the infrared circuit 201 and the switch control end of the visible light circuit 202 are all connected with the wireless communication chip 204;

The wireless communication chip 204 can send a corresponding control signal to the switch control end of the infrared circuit 201 according to the control information for lighting the infrared light beads 101 received from the head-mounted device, so as to control the infrared circuit 201 to light the infrared light beads 101. Or the wireless communication chip 204 can send a corresponding control signal to the switch control end of the infrared circuit 201 according to the control information for extinguishing the infrared light beads 101 received from the head-mounted device, so as to control the infrared circuit 201 to extinguish the infrared light beads 101.

The wireless communication chip 204 can send a corresponding control signal to the switch control end of the visible light circuit 202 according to the control information for lighting the visible light strips 102 received from the head-mounted device, so as to control the visible light circuit 202 to light the visible light strips 102. Or the wireless communication chip 204 can send a corresponding control signal to the switch control end of the visible light circuit 202 according to the control information for extinguishing the visible light strips 102 received from the head-mounted device, so as to control the visible light circuit 202 to extinguish the visible light strips 102.

In some embodiments, the handle device further comprises an input device 205 for user operation, and the input device 205 is connected with the processor chip 203.

As shown in FIG. 1, during the operation, a user can input corresponding instructions to the processor chip 203 in the handle device through the input device 205 by operating a key module 104 on the handle device, thus realizing the operation of the handle device. An operable display screen is provided on some kinds of handle devices, and the user can input corresponding instructions to the processor chip 203 in the handle device through the input device 205 by operating a touch screen module, so that the handle device can complete a series of operations, wherein the touch screen module can be arranged at the place where the key module 104 may be located.

In some embodiments, as shown in FIG. 1, the shell 103 may comprise a holding portion 106 for a user to hold the device and a positioning portion 105 for tracking and positioning, wherein the positioning portion is connected with the holding portion. In such embodiments, the input device 205 above may be provided on the holding portion 106, and the infrared light beads 101 and visible light strips 102 above may be provided on the positioning portion 105.

The positioning portion may have any shape, such as a curved band shape, and both ends of the positioning portion are connected with the holding portion. The holding portion may also have any shape, such as a ring shape.

In some embodiments, the wireless communication chip 204 in the handle device may adopt a LoRa low-energy module, a 2G IoT module, or a BLE module, etc., as long as the module can transmit data signals wirelessly, wherein the BLE chip is the best, which can greatly save energy costs.

In an embodiment, the wireless communication chip 204 adopts a BLE chip, wherein its main function is to wirelessly transmit the data information measured by an inertial measurement unit 206 in the handle device to the head-mounted device. Besides, the chip can transmit the data information inputted through the input device 205 by operating the key module or the touch screen module in the handle device to the head-mounted device.

In some embodiments, a wireless communication chip 204 is also provided in the head-mounted device, and a BLE chip as above can be adopted. Therefore, the time synchronization with the wireless communication chip 204 in the handle device and the wireless connection with the handle device are realized by the wireless transmission function of the wireless communication chip 204. For example, the BLE chip in the handle device can receive the control information sent by the BLE chip in the head-mounted device for sending the corresponding control signal to the switch control end of the visible light circuit 202 or the corresponding control signal to the switch control end of the infrared circuit 201.

In some embodiments, the handle device further comprises the inertial measurement unit 206, wherein its main function is to collect attitude data information of the handle device. The attitude data information of the handle device helps to predict and track the position and attitude of the head-mounted device. In order to reduce errors of the attitude data information of the handle device, static and dynamic calibration and temperature compensation are performed for the attitude data information of the handle device.

In some embodiments, a motor drive circuit is arranged in the handle device for controlling a linear motor, which is mainly for better use feedback of the handle device in actual experience. For example, the motor drive circuit is used in the game part to improve the touch function of the key module, which can provide richer input information and enhance the user's virtual reality experience.

In this embodiment, before a camera of the head-mounted device acquires images, a first exposure time for an environment image and a second exposure time for a handle image in an image acquisition cycle of the camera need to be acquired. Exposure parameters of the camera are then set according to the first exposure time and the second exposure time of the camera, wherein the exposure parameters are directly set in a memory of the head-mounted device. Finally, the camera is controlled to acquire the environment image and the handle image according to the exposure parameters of the camera in a time-sharing manner during the image acquisition cycle.

Figure 3:
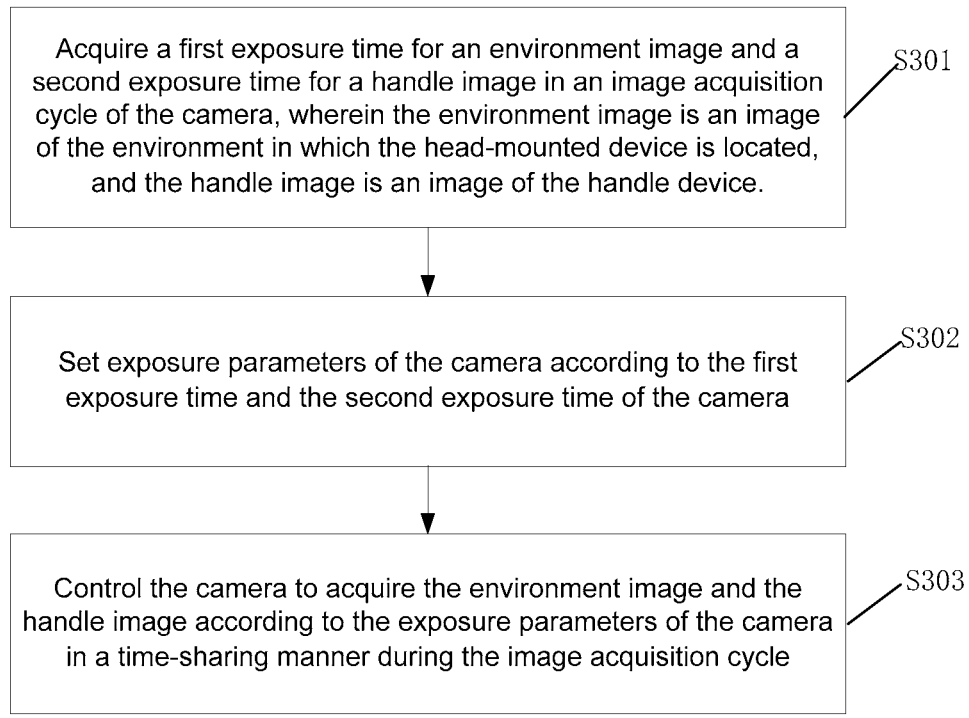
FIG. 3 is a flow chart of an image acquisition method for a handle device according to an embodiment of the disclosure.

FIG. 3 shows a flow chart of an image acquisition method for a handle device according to an embodiment. As shown in FIG. 3, the method could comprise the following steps S301-S303 of:

step S301: acquiring a first exposure time for an environment image and a second exposure time for a handle image in an image acquisition cycle of the camera, wherein the environment image is an image of the environment in which the head-mounted device is located, and the handle image is an image of the handle device;

In some embodiments, the head-mounted device comprises a plurality of cameras, wherein center points of first exposure time for an environment image acquired prior to image acquisition by the plurality of cameras are aligned; and/or, second exposure time for a handle image acquired prior to image acquisition by the plurality of cameras are the same.

Figure 4:
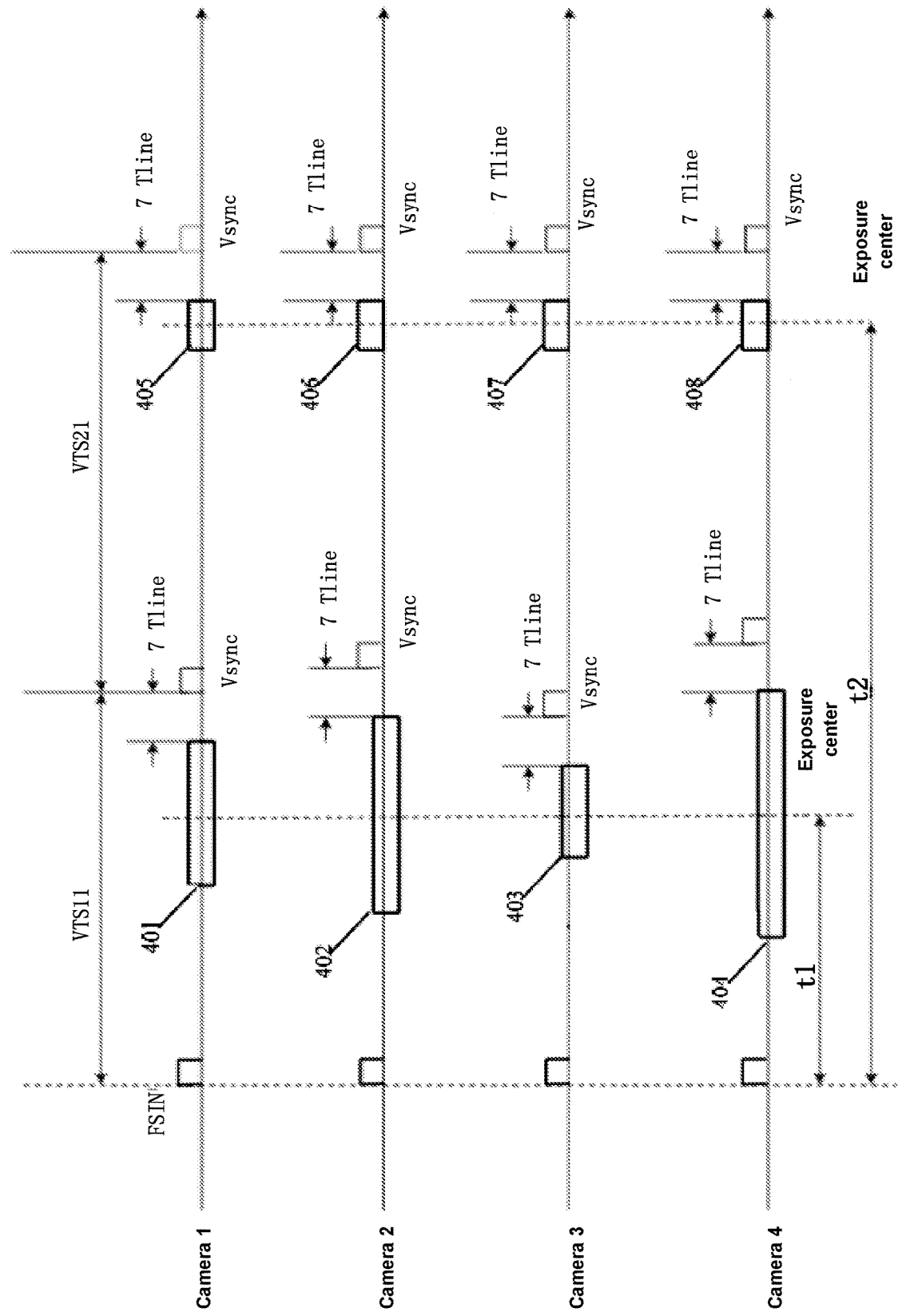
FIG. 4 is a schematic diagram of an exposure process of a camera of a head-mounted device according to an embodiment of the disclosure.

FIG. 4 shows a schematic diagram of an exposure process of a camera of a head-mounted device according to an embodiment. As shown in FIG. 4, the head-mounted device comprises four cameras, wherein centers of first exposure time of the four cameras (camera 1, camera 2, camera 3, and camera 4) are aligned. As in FIG. 4, centers of the first exposure time 401 of the first camera (camera 1), the first exposure time 402 of the second camera (camera 2), the first exposure time 403 of the third camera (camera 3) and the first exposure time 404 of the fourth camera (camera 4) are aligned, but their first exposure time are different. As shown in FIG. 4, the second exposure time 405 of the first camera (camera 1), the second exposure time 406 of the second camera (camera 2), the second exposure time 407 of the third camera (camera 3), and the second exposure time 408 of the fourth camera (camera 4) are the same, and centers of their second exposure time are also aligned.

step S302: setting exposure parameters of the camera according to the first exposure time and the second exposure time of the camera;

In some embodiments, the plurality of cameras are affected by ambient light during image acquisition, and the exposure parameters of the plurality of cameras are also different. Therefore, after each camera acquires an environment image, the timestamp data of the acquired images are different.

In order to ensure that each frame has the same timestamp data when each camera collects environment images, it is necessary to set the VTS of each camera to ensure the alignment of the exposure center point at this moment. The setting is shown in FIG. 4:

If there are four cameras (camera 1, camera 2, camera 3, and camera 4), in VTS 11, the first exposure time of the four cameras are different, but the center points of the first exposure time of the four cameras need to be aligned; in the VTS 21, the second exposure time of the four cameras need to be the same and the center points of the second exposure time of the four cameras are aligned.

step S303: controlling the camera to acquire the environment image and the handle image according to the exposure parameters of the camera in a time-sharing manner during the image acquisition cycle.

In some embodiments, when the handle image is acquired, lower exposure parameters (dozens to hundreds of microseconds) are usually used as the brightness of the visible light patterns and infrared light spots of the handle device is higher than that of external environment, which can reduce the power consumption of the handle system and reduce the influence of external environment on the visible light patterns and infrared light spots of the handle device. In addition, higher exposure parameters can also be adopted for different environments.

In an embodiment, images are acquired at 60 Hz and 30 Hz, wherein the plurality of cameras can acquire images at 60 Hz. Some cameras track the environment images at 30 Hz to complete the function of tracking the head-mounted device, and some cameras track the visible light patterns and infrared light spots on the handle device at 30 Hz to complete the function of tracking the handle device. Images are also acquired at 60 Hz and 90 Hz. The specific arrangement can be set at will by the user.

In some embodiments, the plurality of cameras need to operate synchronously, and then turn on the infrared circuit and the visible light circuit when the handle image is exposed, which is beneficial to reduce the power consumption of the handle device. When the plurality of cameras operate synchronously, it is necessary to realize the alignment of their exposure center points, so as to keep the same timestamp data for each frame collected by the plurality of cameras.

In some embodiments, a first lighting time for the handle device to light the infrared light beads and a second lighting time for lighting the visible light strips are obtained in the image acquisition cycle according to the second exposure time;

Control information about the first lighting time and the second lighting time is transmitted to the handle device to enable the handle device to control the infrared circuit and the visible light circuit according to the control information.

Figure 5:
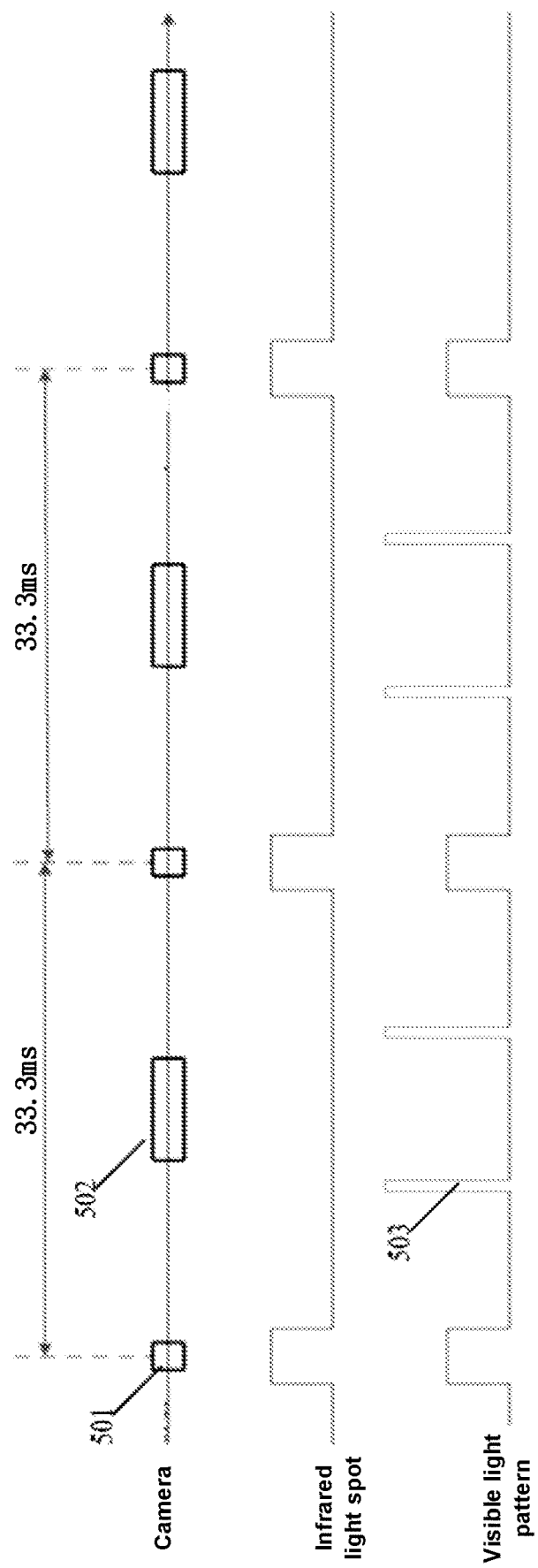
FIG. 5 is a control schematic diagram of visible light spots and infrared patterns of a handle device according to an embodiment of the disclosure.

In an embodiment, FIG. 5 shows a control schematic diagram of visible light spots and infrared light patterns of a handle device according to an embodiment. As shown in FIG. 5, when the handle device is exposed 501, the infrared circuit 201 and the visible light circuit 202 are turned on, that is, the infrared light beads are lit under the control of the infrared circuit 201 and LED light strips of visible light are lit under the control of the visible light circuit 202. When the head-mounted device is exposed 502, the infrared circuit 201 and the visible light circuit 202 are turned off.

Since the head-mounted device and the handle device are turned on through wireless synchronization realized by the wireless communication chip 204 and there are deviations of control information and deviations from system crystal oscillators, the lighting time of the infrared light beads is longer than the time of the exposure 502 of the head-mounted device. Besides, during the exposure 502 of the head-mounted device, an anti-scintillation pulse 503 is added to the visible light patterns, and the LED light strips of the visible light are kept refreshed at 90 Hz, wherein the refreshing frequency of the LED light strips of the visible light can be set by the user.

In some embodiments, the anti-scintillation pulse 503 added in the visible light patterns is controlled by a narrow pulse outputted by a large current, which further ensures that the anti-scintillation pulse will not be lit when the head-mounted device is tracking images. Adding the anti-scintillation pulse into the visible light patterns can not only reduce the power consumption of the visible light, but also have no impact on the function of tracking the head-mounted device.

In some embodiments, a time gap of bluetooth transmission between the head-mounted device and the handle device is monitored; a beacon frame for time synchronization to the handle device is transmitted in the time gap.

As mentioned above, the wireless connection between the head-mounted device and the handle device is realized through the wireless communication chip 204, wherein a wireless BLE chip or a wireless 2.4 G private protocol chip can be adopted. The wireless BLE chip mainly realizes the transmission of attitude data information of the handle and input data information of the input device, and ensures stable transmission with its advantage of strong anti-interference ability. The wireless 2.4 G private protocol chip sends a beacon data package of a period of time by utilizing the time gap of BLE transmission between the head-mounted device and the handle device after an interval data transmission is completed by the wireless BLE chip. As the 2.4 G private protocol does not have complex protocol stack operations, the bottom part of RF transmission and reception can be directly read and written, and there are no operations such as data retransmission. Therefore, the time interval between sending and receiving a data package is basically fixed. Taking advantage of this feature, the time system of the head-mounted device and the handle device can be well synchronized. The local time accuracy of the handle device and the head-mounted device is high, so it is not necessary to synchronize the time system frequently, and the data synchronization done once at a certain interval (such as 1 s) can meet the synchronization requirements, and the power consumption caused by frequent wireless communication can also be solved.

In some embodiments, a distance between the head-mounted device and the handle device is obtained; lighting brightness of the visible light strips is determined according to the distance; and control information about the lighting brightness is transmitted to the handle device to enable the handle device to control the visible light circuit according to the control information.

In some embodiments, during the process of using the handle device, the environment is complex and diverse, so the visible light patterns and infrared light spots are greatly affected by external ambient light when the handle device is located at different positions. Therefore, when the handle device is used for the first time (when started up), it is necessary to perform scanning by infrared light beads and visible light strips from the lowest brightness to the highest brightness until the head-mounted device can successfully calculate and estimate the position and attitude of the handle device through the infrared light spots and visible light patterns.

In some embodiments, when the user uses the handle device, a pixel of images collected by the camera will be supersaturated if the handle device approaches the camera of the head-mounted device at close range; however, if the handle device is far away from the camera of the head-mounted device, the pixel of images collected by the camera will be too dark, which will affect the tracking and tracking accuracy. The specific measures for controlling the distance between the handle device and the head-mounted device are as follows:

After the head-mounted device locks the position and brightness of the handle device (the brightness of infrared light spots and visible light patterns), the processor chip predicts the position of the handle image in the next frame based on the data information of the inertial measurement unit 206, and also predicts exposure time, exposure gain and brightness of the image in the next frame. The exposure time and exposure gain are directly set in the memory of the head-mounted device, which can ensure the real-time performance and effectiveness.

In practical applications, for the brightness control of the handle device, there will be the possibility of wireless transmission delay and wireless losses, so the overall control logic can mainly be exposure gain adjustment. Without prejudice to the visible light patterns and infrared light spots, adjusting the exposure parameters of the camera within the user's use distance range (such as 10 cm-120 cm) can achieve a better tracking effect. Therefore, adjusting the brightness of the handle device body can realize better accuracy when the handle device approaches the head-mounted device at a short distance and a long distance.

A head-mounted device is further provided according to the disclosure, comprising a memory and a processor, wherein the memory stores a computer program, and the processor is used to perform the image acquisition method as shown in FIG. 3 under the control of the computer program.

Figure 6:
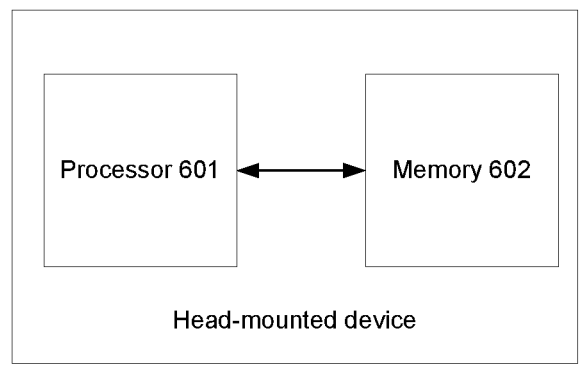
FIG. 6 is a structure diagram of hardware of a head-mounted device according to an embodiment of the disclosure.

FIG. 6 shows a structure diagram of hardware of a head-mounted device according to an embodiment. As shown in FIG. 6, a memory 602 is used for storing a computer program, wherein the computer program is used to control a processor 601 to execute an image acquisition method according to an embodiment of the disclosure. Skilled personnel can design the computer program according to the disclosed scheme of the disclosure. How the computer program controls the processor is well known in the art and will not be described in detail herein.

The computer program can be written with instruction sets such as ×86, Arm, RISC, MIPS, SSE and so on. The memory 602 includes, for example, ROM (Read Only Memory), RAM (Random Access Memory), and non-volatile memories such as hard disks.

Figure 7:
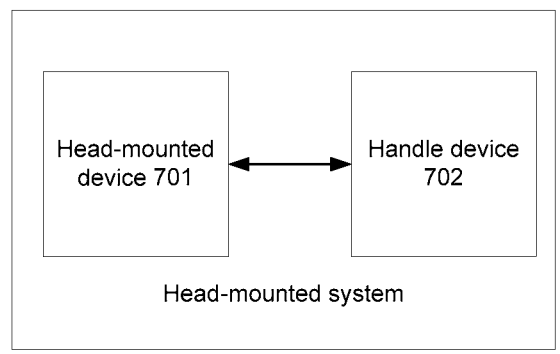
FIG. 7 is a structure diagram of a head-mounted system according to an embodiment of the disclosure.

A head-mounted system is further provided according to the disclosure. FIG. 7 shows a structure diagram of a head-mounted system according to an embodiment. As shown in FIG. 7, the head-mounted system comprises a head-mounted device 701 and a handle device 702, wherein the head-mounted device 701 is wirelessly connected with the handle device 702.

In this embodiment, the head-mounted device and the handle device as well as the wireless connection have been discussed and will not be repeated herein.

Embodiments of the disclosure may be systems, methods, and/or computer program products. The computer program products may include computer-readable storage media loaded with computer-readable program instructions for enabling processors to implement aspects of the disclosure.

The computer-readable storage media may be tangible devices that may hold and store instructions used by the instruction executing devices. The computer-readable storage media may include but is not limited to electrical storage devices, magnetic storage devices, optical storage devices, electromagnetic storage devices, semiconductor storage devices, or any suitable combination of the above. More specific examples (a non-exhaustive list) of the computer-readable storage media include the portable computer disk, hard disk, random access memory (RAM), read-only memory (ROM), erasable programmable read-only memory (EPROM or flash memory), static random access memory (SRAM), portable compact disk read-only memory (CD-ROM), digital versatile disk (DVD), memory stick, floppy disk, mechanical encoding device such as punched card or grooved bump on which instructions are stored, and any suitable combination of the above. The computer-readable storage media used herein are not interpreted as transient signals themselves, such as radio waves or other freely propagating electromagnetic waves, electromagnetic waves propagating through waveguides or other transmission media (e.g., optical pulses through fiber optic cables), or electrical signals transmitted through wires.

The computer-readable program instructions described herein may be downloaded from a computer-readable storage medium to computing/processing devices, or to an external computer or external storage device over a network, such as the Internet, a local area network, a wide area network, and/or a wireless network. The network may include copper transmission cables, fiber optic transmissions, wireless transmissions, routers, firewalls, switches, gateway computers, and/or edge servers. A network adapter card or a network interface in each computing/processing device receives computer-readable program instructions from a network and forwards the computer-readable program instructions for storage in a computer-readable storage medium in each computing/processing device.

The computer program instructions for performing the operations of the disclosure may be assembly instructions, instruction set architecture (ISA) instructions, machine instructions, machine-related instructions, microcode, firmware instructions, state setting data, or source code or object code written in any combination of one or more programming languages. Programming languages include object-oriented programming languages, such as Smalltalk and C++, and conventional procedural programming languages, such as "C" programming language or similar programming languages.

Computer-readable program instructions may be executed entirely on the user's computer, partly on the user's computer, as a separate software package, partly on the user's computer and partly on a remote computer, or entirely on a remote computer or server. In the case of a remote computer, the remote computer may be connected to a user computer over any kind of networks, including a local area network (LAN) or a wide area network (WAN), or may be connected to an external computer (e.g., via the Internet using an Internet service provider). In some embodiments, an electronic circuit can be personalized by using state information of computer-readable program instructions, such as a programmable logic circuit, a field programmable gate array (FPGA), or a programmable logic array (PLA), wherein the electronic circuit can execute the computer-readable program instructions, realizing aspects of the disclosure.

Various aspects of the disclosure are described herein with reference to flow charts and/or block diagrams of methods, devices (systems) and computer program products according to embodiments of the disclosure. It should be understood that each block of the flow chart and/or block diagram and combinations of the blocks in the flow chart and/or block diagram may be implemented by computer-readable program instructions.

These computer-readable program instructions may be provided to a processor of a general-purpose computer, a special-purpose computer, or other programmable data processing devices, thus producing a machine. Therefore, such instructions, when executed by a processor of a computer or other programmable data processing devices, produce a device for carrying out the functions/actions specified in one or more blocks in the flow chart and/or block diagram. The computer-readable program instructions may also be stored in a computer-readable storage medium. The instructions cause computers, programmable data processing devices, and/or other devices to operate in a specific manner, so that the computer-readable medium in which the instructions are stored produces a machine including instructions for implementing aspects of the functions/actions specified in one or more blocks in the flow chart and/or block diagram.

The computer-readable program instructions may also be loaded onto computers, other programmable data processing devices, or other devices, so that a series of operational steps are performed on computers, other programmable data processing devices, or other devices to produce a computer-implemented process. In this way, instructions executed on the computers, other programmable data processing devices, or other devices perform the functions/actions specified in one or more blocks in the flow chart and/or block diagram.

The flow charts and block diagrams in the drawings illustrate possible architectures, functions and operations achieved by systems, methods and computer program products according to various embodiments of the disclosure. In this regard, each block in a flow chart or block diagram may represent a part of a module, a program segment, or an instruction that contains one or more executable instructions for performing a specified logical function. In some alternative implementations, the functions indicated in the blocks may also occur in a different order with those indicated in the drawings. For example, two consecutive blocks can be executed substantially in parallel, or they can sometimes be executed in reverse order, depending on the functionality involved. It is also noted that each block in the block diagrams and/or flow charts, and combinations of the blocks in the block diagrams and/or flow charts, may be implemented in a dedicated hardware-based system that performs a specified function or action, or may be implemented in a combination of dedicated hardware and computer instructions. It is well known to those skilled in the art that implementation by hardware, implementation by software, and implementation by a combination of software and hardware are all equivalent.

Embodiments of the disclosure have been described above and the above description is exemplary and is not exhaustive, and is not limited to the disclosed embodiments. Many modifications and changes will be apparent to those of ordinary skill in the art, without departing from the scope and spirit of the illustrated embodiments. The terminology used herein is chosen to best explain the principles and practical applications of the embodiments or technical improvements in the market, or to enable other persons of ordinary skill in the art to understand the embodiments disclosed herein. The scope of the disclosure is defined by the appended claims.

What is claimed is:

1. A handle device, comprising:
   a shell;
   a control module, wherein the control module is arranged in the shell;
   an infrared circuit, wherein a switch control end of the infrared circuit is connected with the control module, and infrared light beads of the infrared circuit penetrate outwards through the shell; and
   a visible light circuit, wherein a switch control end of the visible light circuit is connected with the control module, and visible light strips of the visible light circuit penetrate outwards through the shell,
   wherein the control module is configured to extinguish both of the infrared light beads and the visible light strips in a first exposure time for an environment image in an image acquisition cycle of the camera, and light both of the infrared light beads and the visible light strips in a second exposure time for a handle image in the image acquisition cycle of the camera, and wherein the environment image is an image of the environment in which the head-mounted device is located, and the handle image is an image of the handle device.

2. The handle device according to claim 1, wherein the control module comprises a processor chip and a wireless communication chip connected with the processor chip, and the switch control end of the infrared circuit and the switch control end of the visible light circuit are all connected with the wireless communication chip; and
the handle device further comprises an input device for user operation, and the input device is connected with the processor chip.

3. The handle device according to claim 2, wherein the wireless communication chip is a Bluetooth Low Energy (BLE) chip.

4. The handle device according to claim 2, wherein the handle device further comprises an inertial measurement unit, and the inertial measurement unit is connected with the wireless communication chip.

5. An image acquisition method based on a handle device, wherein the image acquisition method is implemented by a head-mounted device provided with at least one camera, and the method comprises the following steps:
acquiring a first exposure time for an environment image and a second exposure time for a handle image in an image acquisition cycle of the camera, wherein the environment image is an image of the environment in which the head-mounted device is located, and the handle image is an image of the handle device;
setting exposure parameters of the camera according to the first exposure time and the second exposure time of the camera; and
controlling the camera to acquire the environment image and the handle image according to the exposure parameters of the camera in a time-sharing manner during the image acquisition cycle,
wherein the method further comprises:
obtaining a first lighting time for the handle device to light infrared light beads of the handle device and a second lighting time for lighting visible light strips of the handle device in the image acquisition cycle according to the second exposure time; and
transmitting control information about the first lighting time and the second lighting time to the handle device to enable the handle device to control the infrared light beads and the visible light strips according to the control information, such that both of the infrared light beads and the visible light strips are extinguished in the first exposure time for the environment image, and both of the infrared light beads and the visible light strips are lit in the second exposure time for the handle image.

6. The image acquisition method according to claim 5, wherein the head-mounted device comprises a plurality of cameras, and center points of first exposure time of the plurality of cameras are aligned, and/or second exposure time of the plurality of cameras are the same.

7. The image acquisition method according to claim 5, wherein the method further comprises the following steps:
monitoring a time gap of bluetooth transmission between the head-mounted device and the handle device; and
transmitting a beacon frame for time synchronization to the handle device in the time gap.

8. The image acquisition method according to claim 5, wherein the method further comprises the following steps:
obtaining a distance between the head-mounted device and the handle device;
determining lighting brightness of the visible light strips according to the distance; and
transmitting control information about the lighting brightness to the handle device to enable the handle device to control the visible light circuit according to the control information.

9. A head-mounted device, comprising:
a memory configured to store a computer program; and
a processor configured to execute the computer program to:
acquire a first exposure time for an environment image and a second exposure time for the handle image in an image acquisition cycle of the camera, wherein the environment image is an image of the environment in which the head-mounted device is located, and the handle image is an image of the handle device;
set exposure parameters of the camera according to the first exposure time and the second exposure time of the camera; and
control the camera to acquire the environment image and the handle image according to the exposure parameters of the camera in a time-sharing manner during the image acquisition cycle,
wherein the processor is further configured to:
obtain a first lighting time for the handle device to light infrared light beads of the handle device and a second lighting time for lighting visible light strips of the handle device in the image acquisition cycle according to the second exposure time; and
transmit control information about the first lighting time and the second lighting time to the handle device to enable the handle device to control the infrared light beads and the visible light strips according to the control information, such that both of the infrared light beads and the visible light strips are extinguished in the first exposure time for the environment image, and both of the infrared light beads and the visible light strips are lit in the second exposure time for the handle image.

10. A head-mounted system, comprising the head-mounted device as claimed in claim 9 and a handle device, wherein the head-mounted device is wirelessly connected with the handle device;
wherein the handle device comprises:
a shell;
a control module, wherein the control module is arranged in the shell;
an infrared circuit, wherein a switch control end of the infrared circuit is connected with the control module, and the infrared light beads of the infrared circuit penetrate outwards through the shell; and
a visible light circuit, wherein a switch control end of the visible light circuit is connected with the control module, and the visible light strips of the visible light circuit penetrate outwards through the shell.

11. The head-mounted device according to claim 9, the processor is further configured to:
monitor a time gap of bluetooth transmission between the head-mounted device and the handle device; and
transmit a beacon frame for time synchronization to the handle device in the time gap.

12. The head-mounted device according to claim 9, the processor is further configured to:
obtain a distance between the head-mounted device and the handle device;
determine lighting brightness of the visible light strips according to the distance; and transmit control information about the lighting brightness to the handle device to enable the handle device to control the visible light circuit according to the control information.

13. The head-mounted system according to claim 10, wherein the control module comprises a processor chip and a wireless communication chip connected with the processor chip, and the switch control end of the infrared circuit and the switch control end of the visible light circuit are all connected with the wireless communication chip; and the handle device further comprises an input device for user operation, and the input device is connected with the processor chip.

14. The head-mounted system according to claim 13, wherein the wireless communication chip is a Bluetooth Low Energy (BLE) chip.

15. The head-mounted system according to claim 13, wherein the handle device further comprises an inertial measurement unit, and the inertial measurement unit is connected with the wireless communication chip.

16. The head-mounted system according to claim 10, wherein the head-mounted device comprises a plurality of cameras, and center points of first exposure time of the plurality of cameras are aligned, and/or second exposure time of the plurality of cameras are the same.

17. A computer-readable storage medium, wherein the computer-readable storage medium stores a computer program, and the computer program implements the steps of the method as claimed in claim 5 when executed by a processor.

\* \* \* \* \*